March 11, 1969     T. E. HOLLAND     3,432,239
OPTICAL INSTRUMENTS OF THE INTERFERENCE TYPE
Filed April 15, 1965     Sheet 1 of 3
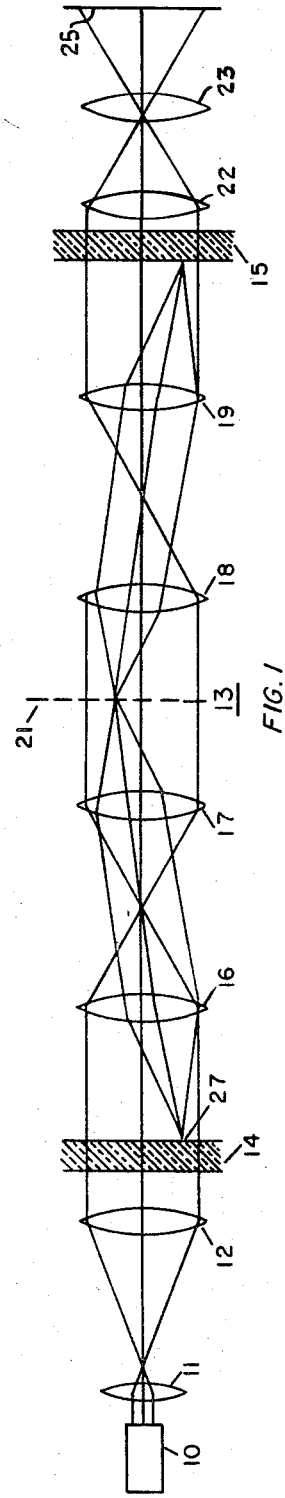
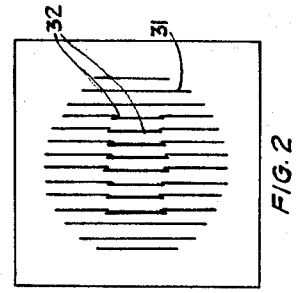
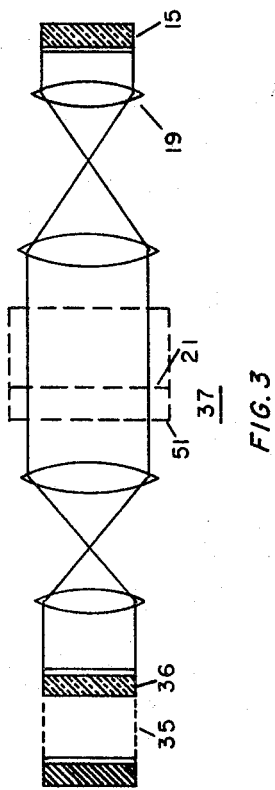
INVENTOR
THOMAS E. HOLLAND
BY,
ATTORNEYS

INVENTOR
THOMAS E. HOLLAND

ATTORNEYS

United States Patent Office 3,432,239
Patented Mar. 11, 1969

3,432,239
OPTICAL INSTRUMENTS OF THE INTERFERENCE TYPE
Thomas E. Holland, Sunnyvale, Calif., assignor to Technical Operations, Incorporated, Burlington, Mass., a corporation of Delaware
Filed Apr. 15, 1965, Ser. No. 448,359
U.S. Cl. 356—112
Int. Cl. G01b 9/02; H01s 3/00
16 Claims

ABSTRACT OF THE DISCLOSURE

This disclosure depicts multiple pass interferometric apparatus providing enhanced resolution and sensitivity. In each of the disclosed embodiments, telescopic optical imaging means are provided within a Fabry-Perot resonant cavity fed from an externally located source of highly coherent quasi-monochromatic radiation, the imaging systems each being adapted to image each of the cavity end reflectors upon the other reflector. Embodiments are shown in which the imaging system within the cavity is arranged such that point-by-point optical perturbations of the multiply reflected wavefronts caused by an object under study appear at the output of the interferometer. A Schlieren embodiment is depicted.

---

Figure 1A:
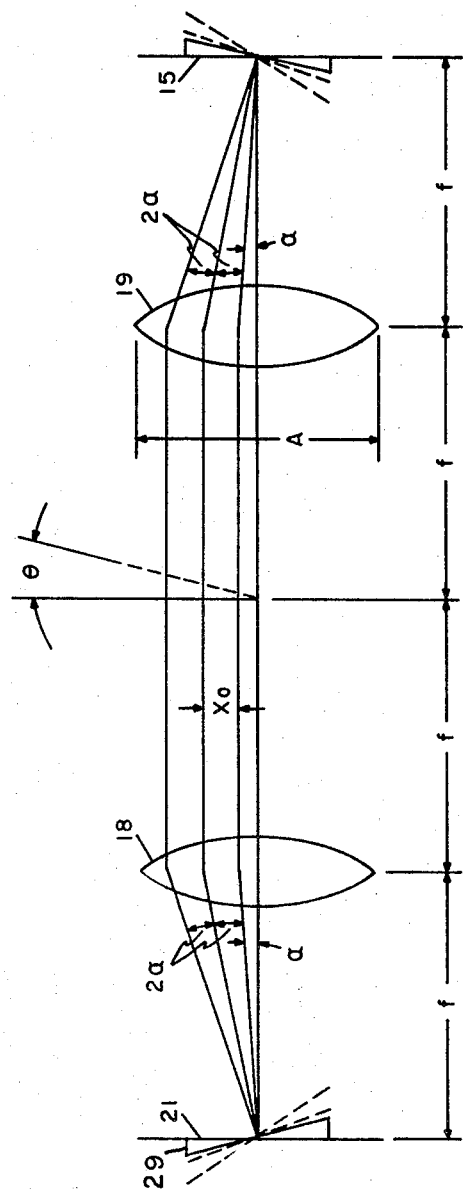

Interferometers are used as highly accurate measuring instruments for determining light wavelengths, refractive indices, distances, and other parameters that can be manifested as a change in the complex amplitude of light traversing an optical path. Perhaps the two most important characteristics of an interferometer are its resolution and its flexibility in adaptation for measuring large varieties of subject matter.

One type of interferometer, the Mach-Zehnder, is quite flexible, but is a single pass interferometer with correspondingly low resolution. Multiple pass interferometers such as the Fabry-Perot attain much higher resolution capability by reflecting the same light back and forth through the critical optical path a plurality of times thus multiplying the effect of the phase shifts or other changes involved and greatly sharpening any interference fringes produced. The advantage in resolution of the Fabry-Perot interferometer, however, relies on maintaining a high Q in the optical cavity. The requirement of high Q makes flexibility difficult and the use of the Fabry-Perot arrangement has heretofore been limited to fairly simple situations such as measuring the refractive index of a gas placed in the optical cavity, and measuring wavelengths of light introduced into the cavity. The effect of an object (such as a gas) placed in the optical cavity is integrated in the Fabry-Perot interferometer and local variations in the object are not distinguished.

In accordance with, and as one example of, the present invention, an arrangement of a multiple pass interferometer has been found that has the high resolution capabilities of the Fabry-Perot interferometer with greatly improved flexibility. This new interferometer has the particular advantage of being able to distinguish and measure local variations in an object. The invention has been achieved in one case by placing two sets of telescope optics within an optical cavity defined by two partially transparent end mirrors with the telescope exit pupils coextensive with the mirrors and the telescope entrance pupils coextensive with each other in the object region. The cavity is fed with collimated radiation having a high degree of both temporal and spatial coherence such as that which is available from a helium-neon gas laser, incident on one of the mirrors. With this arrangement, any one portion of the beam passes through the same point in the object field on successive reflections so that local differences are maintained distinct.

Thus it is one object of the present invention to define a high resolution multiple pass interferometer of improved flexibility.

Systems of this kind can be used in one configuration employing parallel end mirrors as an ultra-sensitive Schlieren systems, or for phase contrast enhancement as in phase-contrast microscopy. In another configuration, with the end mirrors slightly non-parallel, such systems can be used to establish an arbitrary reference fringe system for interference measurement purposes. In either case, the distance between the mirrors can range from lengths of the order of centimeters to lengths of the order of meters, and the object field can be three-dimensional as well as essentially two-dimensional, depending on the particular optical configurations adopted.

In accordance with another example of the invention, an arrangement has been found for maximizing the intensity of radiation within the interferometer cavity, by coupling the latter directly to a laser cavity.

Figure 4:
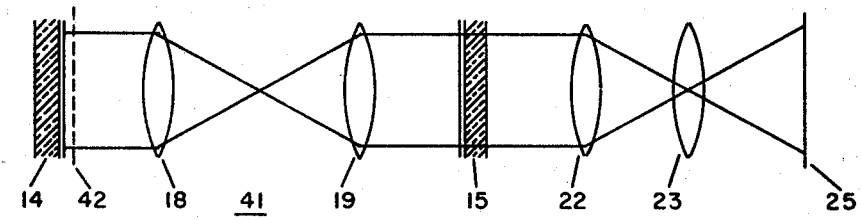
Figure 5:
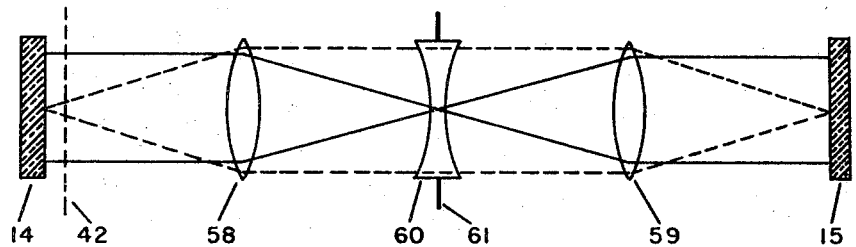

Further objects and features of the present invention will become apparent upon reading the following specification with reference to the drawings in which:

FIG. 1 is a diagrammatic illustration of one embodiment of an interferometer according to the invention;
FIG. 1A is a schematic for fringe analysis;
FIG. 2 is a plan view of a pattern of interference fringes which can be obtained with this interferometer;
FIG. 3 is a diagrammatic illustration of a second embodiment of the interferometer according to the invention;
FIG. 4 is a diagrammatic illustration of a third embodiment of an interferometer in accordance with the invention; and
FIG. 5 illustrates another interferometer according to the invention.

Interferometers operate using light interference to produce changes in light amplitude that may be measured, or fringes which may be counted or compared. Light interference requires some amount of coherency between the light components at the point where interference occurs. The longer the time interval over which substantial coherence is to be maintained, the more critical is the requirement of coherence in the illuminating beam. In the case of multiple pass interferometers, substantial coherence is desirably maintained over the interval that the cavity sustains echoes of a given quantity of light introduced. At each pass through the cavity, the given quantity interferes with further quantities introduced so that until the given quantity diminishes to an ineffective value, sensitivity can be expected to vary in a direct relation with coherence between the given quantity and further quantities.

Two beams of light are said to be coherent when the phase difference between the waves by which they are represented is constant during the period normally covered by observations. In the multiple pass interferometer, the two beams can be considered to be a beam newly introduced into the cavity and a beam representing any one of the multiple passes. This presents a large "normal period of observations." The present invention thus places severe requirements on the spectral width of the light source.

Light source 10 in FIG. 1 is preferably a laser such as a helium-neon gas laser having large temporal coherence. The required temporal coherence can be obtained with known light sources other than lasers, but the process of obtaining it results in very low efficiency levels. Lenses 11 and 12 form the laser collimator and function to provide a collimated beam of a given diameter for introduction to optical cavity 13 defined by partially transparent mirrors 14 and 15. Optical cavity 13 is a configuration sometimes referred to as a Fabry-Perot enclosure and is a common type of enclosure used for gas lasers. The term "Fabry-Perot enclosure" is used herein to cover this configuration both for the laser and the interferometer cavity and is defined as an optical cavity bounded at opposite ends by a pair of uniform mirror surfaces at least one of which is partially transparent. Mirrors 14 and 15 are high quality optical "flats" or prisms silvered for a high spectral reflectance at the primary wavelength of source 10. It will be recognized that this requirement of high reflectance results in a waste of most of the light incident on mirror 14 from source 10. However, high reflectance in mirrors 14 and 15 is necessary to obtain high Q in cavity 13.

Within cavity 13, a first telescope system represented by lenses 16 and 17 and a second telescope system represented by lenses 18 and 19 are arranged with the exit pupils coextensive with mirrors 14 and 15 respectively and the entrance pupils coextensive in object plane 21. Mirror 15 is in the image plane and additional lenses 22 and 23 serve to collect image light and refocus the image on a photosensitive layer 25 for recording purposes.

The telescope systems are arranged so that object plane 21 is imaged at mirrors 14 and 15 which fold the images back so that they are reimaged back at object plane 21. The telescope systems can be arranged in any way that will accomplish this result. For example, the object plane can be made large while the exit pupils (the optical path diameter) at mirrors 14 and 15 are small. Likewise one of the exit pupils can be larger than the other.

FIG. 1 is illustrated in the simplest arrangement in which the lenses all have the same focal length, with a constant diameter optical path within the cavity and the telescope lenses arranged symmetrically around object plane 21. In any event, the lenses of each telescope are separated from each other by the sum of their focal lengths, and lenses 16 and 19 are separated from mirrors 14 and 15, respectively, each by its own focal length.

In the operation of FIG. 1, a finite quantity of light from laser 10 enters cavity 13 through mirror 14 and undergoes multiple passes in cavity 13 with a fraction of the energy on each pass transmitted through mirror 15. Because of the large temporal coherence of radiation from laser 10, the wave fronts (with decaying amplitude) representing the energy on each pass, can interfere even though the path difference between successive passes is in the order of meters.

With a perfect optical system in exact alignment, the image plane (at mirror 15) will be uniformly bright or dark depending on the phase difference between the wavefronts for consecutive passes. The addition of a linear phase taper in a horizontal direction will result in sharp vertical interference fringes in the image plane. This can be obtained by tilting one of mirrors 14 or 15 slightly or by introducing a tapered phase plate in the cavity. It should be noted that the mode of operation of laser 10 can affect these interference fringes and the preferable mode to obtain uniphase operation is the $TEM_{00}$ mode. On the other hand the present system can also be utilized to determine the operational modes of a laser as well as to measure the output wavelengths.

We refer now to FIG. 1A showing in more detail the section of the interferometer between the object and image planes. In any portion of the object field, we introduce a disturbance 29; for instance, a linear phase taper. A wavefront passing through the taper a single time will be deflected by an angle $\alpha$, but the angular deviation between consecutive wavefronts will be $2\alpha$. This occurs because the optical system always returns the portion of the wavefront affected by the disturbance directly back through it and in consecutive passes, the wavefront traverses the disturbance twice. Therefore, the multiple reflected beams produce a fan of plane waves (in the region of the disturbance) with decaying amplitude and with an angular deviation of $2\alpha$ between consecutive wavefronts. These wavefronts imaged at mirror 15 are associated with an array of diffraction patterns in the Fourier transform plane between the lenses (as shown in FIG. 1A). Now we can express the phase relation between consecutive fronts in the form $$\phi = 2\pi \left( \frac{2x\alpha}{\lambda} + \frac{2L}{\lambda} + \frac{2\Delta P}{\lambda} \right)$$

where $\phi$=phase between consecutive fronts,
$x$=coordinate in image plane,
$L$=total optical path length between mirrors 14 and 15,
$\Delta P$=any arbitray phase step in object plane,
$\alpha$=deflection angle produced by a disturbance or by rotation of either mirrors 14 or 15,
$\lambda$=the wavelength of the illuminating beam.

Now let the reflectivity of mirrors 14 and 15 be R with transmission Q and let $T_L$ be the transmission (accounting for losses by reflection and absorption) of the lens system for light passing a single direction. The sum of the amplitudes of the wavefronts can be put in the form of the infinite series (2)
$$A = QT_L^{1/2} e^{\frac{2\pi i x \alpha}{\lambda}} [1 + (T_L R)e^{i\delta} + (T_L R)^2 e^{2i\delta} + \ldots]$$

where $$\delta = 2\pi \cdot 2 \left( \frac{x\alpha}{\lambda} + \frac{L}{\lambda} + \frac{\Delta P}{\lambda} \right)$$

Equation 2 can be expressed (3)
$$A = QT_L^{1/2} e^{\frac{2\pi i x \alpha}{\lambda}} \left[ \frac{1}{1 - (T_L R)e^{i\delta}} \right]$$

Equation 3 multiplied by its complex conjugate gives the intensity distribution in the fringes and this can be written in the form (4)
$$I = Q^2 T_L \frac{1}{(1-(T_L R))^2} \left[ \frac{1}{1 + \frac{4(T_L R)}{(1-(T_L R))^2} \sin^2 \frac{\delta}{2}} \right]$$

Now we can use the Rayleigh criterion for estimating the sensitivity of the system. This condition requires that we set (5) $\quad I/I_{max.} = 0.405$ and therefore from (4) we obtain (6)
$$\sin^2 2\pi \left( \frac{x\alpha}{\lambda} + \frac{L}{\lambda} + \frac{\Delta P}{\lambda} \right) = 0.367 \frac{(1-(T_L R))^2}{(T_L R)}$$

$$\sin 2\pi \left( \frac{x\alpha}{\lambda} + \frac{L}{\lambda} + \frac{\Delta P}{\lambda} \right) = 0.606 \frac{(1-(T_L R))}{(T_L R)^{1/2}}$$

or by reference to FIGURE 1A we see that Equation 6 can be written in the form (7)
$$\sin 2\pi \left( \frac{x_0 \theta}{2\lambda} + \frac{L}{\lambda} + \frac{\Delta P}{\lambda} \right) = 0.606 \frac{(1-(T_L R))}{(T_L R)^{1/2}}$$

where $x_0 = 2\alpha f$
$f$=focal length of lens 19 (FIG. 1A)
$x/f = \theta$

In the argument of the sine, let $\Delta P = 0$ and $L/\lambda =$ an integer and also since the right side of (7) is small for $(T_L R) \rightarrow 1.0$ the sine can be equated to the angle so that Equation 7 becomes (8)
$$\pi x_0 \frac{\theta}{\lambda} = 0.606 \frac{(1-(T_L R))}{(T_L R)^{1/2}}$$

But from (4) we note that the angle $\theta_f$ bewteen fringes is given by $$\theta_f = \lambda / x_0$$

Now in (8) we set $\theta = n\theta_f$ and we obtain (9)
$$\pi n = 0.606 \frac{(1-(T_L R))}{(T_L R)^{1/2}}$$

where
$n = \theta/\theta_f$ (sensitivity)

If the product $(T_L R) = 0.98$; $n = 0.004$ and so $$\theta = 4 \times 10^{-3} \theta_f$$

Resolution as used herein is defined as the number of fringes per unit of field while sensitivity $n$ is the ratio of the fringe width to the fringe spacing.

In the ordinary double beam interferometers producing "cosine fringes," it is difficult to achieve a value of $n$ smaller than one or two tenths. It is also interesting to note that the sensitivity is independent of the fringe spacing; i.e., the fringe profile scales with spacing. Now the resolution of the system is concerned with the detection and measurement of fringe spacing or displacement in a small local area in the object field. The resolution therefore is a function of the sensitivity and is inversely proportional to the fringe spacing. When the fringe spacing becomes very small, the array of diffraction images in the transform plane between the two lenses is terminated by the finite aperture of the second lens. This means that instead of summing the amplitudes of an infinite number of wavefronts as in Equations 2 and 3, we sum a truncated series given by

(10)
$$A = Q T_L^{1/2} e^{\frac{2\pi i x a}{\lambda}} \left[ \frac{1-(T_L R)^M e^{M i \delta}}{1-(T_L R) e^{i \delta}} \right]$$

and the intensity can be expressed as

(11)
$$I = Q^2 T_L \left[ \frac{1+(T_L R)^{2M} - 2(T_L R)^M \cos M\delta}{1+(T_L R)^2 - 2(T_L R) \cos \delta} \right]$$

M is defined as the number of passes a beam of light makes in the cavity.

In Equation II $M = A/2x_0$ (see FIG. 1A) and it is clear that for $(T_L R) \to 1.0$, larger values of M are required for Equation 11 to become equivalent to Equation 4. For small values of M (small fringe spacing), the *sensitivity* approaches that of the ordinary two beam interferometers. Now the maximum sharpness the fringes can attain is set by the diffraction limit imposed by the half aperture of the second lens in FIG. 1A. For instance, in Equation 8, we can set $\theta = 2.5 \lambda / A$ and for $(T_L R) = 0.98$ we obtain $M = A/2x_0 = 335$. Now if A and the total image field angle $\theta_T$ are specified, the number of fringes in the field and therefore the *resolution* can be determined having sensitivity $n = 4 \times 10^{-3}$. Hence the resolution is optimum for this condition since $M > 335$ the sensitivity remains constant, but the resolution falls off $\sim 1/M$. For $M < 335$ the sensitivity falls off with reduction in the number of passes. Since the Q of the cavity will determine the number of passes, varying the Q will permit adjusting the sensitivity from about that in single pass interferometers such as the Mach-Zehnder to about fifty times greater as the number of passes approaches 335.

The particular advantages of the present invention become apparent when mirror 15, for example, is tilted to produce interference fringes and a disturbance producing a phase shift is introduced at a small portion of object plane 21. The result at the image plane (mirror 15) is a background of the original fringes and an area of deviated fringes corresponding to an inverted image of the disturbance.

The original fringes can be used as a known reference system and the characteristics of the disturbance can be determined by the deviations. Variations in the disturbing object will show up as corresponding variations in the fringe deviations. By way of example, the thickness variations in an optical lens can be accurately gauged in this way. Minute optical flaws can also be distinguished and located.

FIG. 2 is an interference pattern obtained with the interferometer of FIG. 1 with a small glass chip positioned in the object plane and exhibiting a small phase step. Background fringes 31 are arbitrary reference fringes introduced by tilting one of the mirrors. Since the angle of tilt only shifts one edge of the mirror a few light wavelengths with respect to the other edge, the reflection angle does not change enough to seriously affect image sense. Deviated fringes 32 show an outline that corresponds exactly to an inverted image of the glass chip. The shift in the fringe system between fringes 32 and fringes 31 indicates the phase shift introduced by the glass chip. A variation in the spacing of fringes 32 would indicate a corresponding variation in the glass chip. A flaw in the glass chip would generally show up as a local step variation in fringes 32 when the glass chip is not supposed to have step variations.

Now if the interferometer is adjusted for a zero fringe field with uniform illumination, a local phase step will appear as a change in intensity; a linear phase taper will be known by a local equi-spaced fringe system (fringes normal to deflection angle), and similarly, a quadratic phase taper by a local fringe system with fringes spaced proportional to the square root of consecutive integers. Furthermore, it is evident that the sensitivity of the system can be adjusted by screening in the transform plane or by controlling the product $(T_L R)$.

The resolution of the system is dependent on the number of effective passes inside the cavity; i.e., M as defined above (Equation 11). The number of effective passes M bears a direct relation to the reflectivity of the end mirrors (14 and 15) and to the transmission of the lens systems in the cavity (accounting for losses due to reflection and absorption by the lenses). Thus M can be reduced by adding a lossy screen to the lens systems or by adjusting the reflectivity of one of the end mirrors, or by vignetting, or by pulsing the laser source. This permits controlling the sensitivity of the interferometer.

FIG. 3 is an embodiment especially adapted for use where a large object plane is required and where high power input is necessary. Laser 35 is a Fabry-Perot type laser in which the output mirror 36 of the laser functions dually as the input end mirror of the interferometer cavity. A hemispherical laser configuration may be substituted. This eliminates the need of collimator lenses and the additional mirror identified in FIG. 1 as items 11, 12 and 14. The entire laser output is utilized substantially increasing the power input to cavity 37. At the same time the diameter of the optical input path is limited to the size of the laser output path.

The embodiment of FIG. 3 uses telescope lens systems with small exit pupils and large entrance pupils providing a large diameter object space, with small mirrors. The telescope systems and cavity in FIG. 3 are shown non-symmetrical about object plane 21 to demonstrate the range of variations available. As long as the object plane is coextensive with the telescope entrance pupils and the mirrors are coextensive with the exit pupils, an infinite number of position variations of the object plane between the two entrance pupils is possible, and thus the system is capable of accommodating three-dimensional objects.

FIG. 4 illustrates an embodiment of the interferometer which can be used if the object is extremely thin. Where the system is balanced around the object plane, image shifts due to refraction are balanced. However with extremely thin objects, refraction shifts can be negligible and the balanced system is no longer required. Thus FIG. 4 shows an interfometer cavity 41 containing a single telescope lens system represented by lenses 18 and 19. The entrance pupil is coextensive with end mirror 14 and object plane 42 is situated immediately adjacent to mirror 14. The exit pupil is coextensive with end mirror 15.

As has been stated, symmetry of the system about the object plane is unnecessary since the systems image back through themselves. The telescope systems can have different focal lengths and magnifications and the entrance and exit pupils do not have to be at the Fourier transform planes of the lenses. The scale of the system can range from a microscopic object field (with a small "tuned" constant frequency laser) to large object fields, wind tunnel size, requiring large lasers with higher power. Thus, in FIG. 3, the object space between the telescope systems can be the test section of a wind tunnel, represented by the dashed box 51. This multiple-pass interferometer can be used for most requirements now being filled by prior art interferometers and Schlieren systems. It will also serve the purpose of a phase contrast microscope and as an inspection device for quality control of lenses, surfaces, flats, and crystals. It can further be used as a high resolution interference spectrometer for studying laser radiation.

For Schlieren representation, consider the sensitivity of a single pass coherent Schlieren system. We refer again to FIG. 1A. Let a collimated beam pass through the object plane forming a diffraction image between the two lenses. Now block off half of the pattern with a semi infinite screen. Suppose that we have an arbitrary disturbance, represented by a linear phase taper producing an angular deflection $\alpha_s$, whose boundary is a circle half the diameter of the lenses. The illumination outside of the disturbance will be uniform but within the boundary, the intensity will be either nearly zero or twice that of the background, depending upon the direction of deflection. For this condition

(12) $$\alpha_s \approx 2.4\lambda/A$$

Now consider a similar disturbance as viewed by the present multipass interferometer adjusted for the zero fringe field. To make the analogy complete, we adjust the phase so that the illumination outside the disturbance region is one half the maximum and uniform. Therefore from Equation 4, we set

(13) $$\sin^2 2\pi\left(\frac{x_0\theta}{2\lambda}+\frac{\Delta P}{\lambda}\right)=\frac{(1-(T_L R))^2}{4(T_L R)}$$

Now we set $x_0 = 0$ (infinite fringe spacing) and let $(T_L R) = 0.98$. Then $\Delta P$ is

(14) $$\Delta P = 0.01\lambda/2\pi$$

In the argument of the sine in (13), we have

(15) $$\frac{x_0\theta}{2\lambda}+\frac{\Delta P}{\lambda}$$

and in (15) we set $\theta = A/4f$ for the angular fringe motion corresponding to a phase change in the disturbance $\Delta P/\lambda$. Therefore we write

(16) $$\frac{x_0 A}{8f\lambda}=\frac{\pm\Delta P}{\lambda}$$

(17) $$x_0=\frac{8f}{A}\Delta P=2\alpha f$$

and therefore

(18) $$\alpha=\frac{4\Delta P}{A}=\frac{0.02\lambda}{\pi A}$$

For this value of $\alpha$, again the illumination in the disturbance area will be nearly twice that of the background or zero depending upon the direction of deflection. A comparison of (18) and (12) shows that very large factors in Schlieren sensitivity can be obtained with the multipass system with the sensitivity adjustable downward by decreasing $(T_L R)$.

The bodies supporting the mirrors 14 and 15 and also the laser mirrors should preferably each have one surface with a low reflection coating, and further, they should preferably be in the form of wedges instead of parallel flats to prevent undesirable background fringe systems. The reflectivity of each mirror should be as high as possible with a reasonably large ratio of transmission to absorption. The material for the lenses and bodies supporting the mirrors should be selected for maximum transmission at the 6328 A. line, in the case where a helium-neon gas laser is used as the illuminating source. At the frequency of the source the preferred reflectivity of mirrors 14 and 15 is in the range of about 99% to 99.8% with a transmission in the range of about .1% to .9%. Results have been good with a reflectivity of 99.5% and transmission of .3%. The system is usable with reflectivities down to about 90% but with a significant reduction is the maximum number of passes attainable.

The losses in the system can be minimized by the use of single component lenses. For instance, for a glass with index 1.5, the spherical aberration is minimum and coma zero for a biconvex configuration with a six to one ratio of radii. The short radius faces the parallel light. The residual spherical aberration can be removed by making the large radius surface aspheric. With multilayer dielectric antireflection coatings, these single lenses (with low loss) can be used to form high quality telescopic systems.

For some applications (i.e., phase contrast microscopy) it may be desirable, in addition, to correct (spherical and coma) the telescopic systems for imaging the entrance pupil (object) on the exit pupil (image).

This can be accomplished for a system with unit magnification by introducing a phase plate or correction lens and stop in the Fourier transform plane. The phase plate corrects spherical aberration for the object and image planes independently without disturbing the corrections for imaging plane waves in the pupil positions. Because of the symmetry of the system, the optical sine condition is fulfilled and therefore the coma is zero.

For this condition, therefore, a single telescopic system is comprised of three single lenses 58, 59 and 60, as shown in FIG. 5, and is aplanatic for two widely separated positions (i.e., as infinity) of object and image. A stop 61 is located in the same plane as the weakly negative (corrector) lens 60. Lenses 58 and 59 are corrected for spherical aberration and coma as a telescopic system.

A laser can be an inherent component in the interferometer system. Adjusted for uniphase operation in the $TEM_{00}$ mode and moderate gain setting (for either the Fabry-Perot or hemispherical configurations), the laser can radiate a series of lines having a constant frequency difference within the 1400 megacycle Doppler broadened envelope. This frequency difference is

(19) $$\Delta\nu_1 = C/2S$$

where $c$ is the velocity of light and $S$ is the optical path between the mirrors in the laser. For large values of $S$, high gain, or slight maladjustment, the laser will radiate lines with frequency difference $\Delta\nu_2$ given by

(20) $$\Delta\nu_2 = C/4S$$

Now because of the large optical path L in the interferometer, even these small frequency differences give rise to a multiple fringe system which is undesirable (unless the laser itself is under investigation). This effect, however, can be eliminated. For instance, the number of wavelengths N in the optical path length L is

(21) $$N = L/\lambda$$

and $$\Delta N = \frac{L}{\lambda}\frac{\Delta\lambda}{\lambda} = \frac{L}{\lambda}\frac{\Delta\nu}{\nu} = \frac{L}{C}\Delta\nu$$

Substituting for $\Delta\nu_1$ from (19) and for $\Delta\nu_2$ from (20) we obtain

(22) $$\Delta N_1 = L/2S; \quad \Delta N_2 = L/4S$$

Now from the argument of the sine in Equation 7, we see that the minimum value of $\Delta N$ for superposition of fringes is one half. And, therefore fringes will be precisely superposed for L having the following values:

(23)     $L = S, 2S, 3S, \ldots$ for $\Delta N_1$ or $L = 2S, 4S, 6S, \ldots$ for $\Delta N_2$ The precision required in the abutment is easy to estimate. For instance let $L=S=48''$. $\Delta L \approx nS$ where $n=4\times10^{-3}$ for $(T_L R)=0.98$ and therefore $\Delta L=0.19''$.

If there are 10 lines under the envelope, the spacing should be adjusted to $0.1\Delta L=0.019''$.

If the power requirements are low and for small object fields, the small tuned constant frequency helium-neon laser can be used with no restriction on the optical path of the interferometer.

Experiments have been performed with the system as shown in FIG. 1 and with half the system (mirror 14 located near the object plane) FIG. 4. The following components were used:

Model 131 spectra-physics gas laser; $S=30$ cm.
4 achromats uncoated, 5" focal length, 1.3" dia.
2 achromats coated, 5" focal length, 1.3" dia.
2 mirrors (14 and 15), $R=0.995$, $Q=0.003$
1 3" focal length triplet (read out lens)
1 Polaroid camera
1 15" focal length 3" dia. achromat
1 micro objective 10X laser collimator The fringe sharpness observed with the four uncoated achromats was distinctly better than with the "cosine" fringe interferometer and a very marked improvement was observed using half the system with two coated achromats.

Multiple fringe patterns were observed due to the multiple lines as discussed in the preceding section. With a low gain adjustment, the laser would operate for short periods at a single frequency. With high gain, a double fringe system persisted and occasionally, a third system would appear—remain a few seconds and disappear due to thermal drift. The relative intensity of the fringe systems also changed with time. From the factor containing the sine in Equation 4, we can write

(24)     $$\sin^2 2\pi\left(\frac{x_0\theta}{2\lambda}+\Delta N_1\right)$$

where $\Delta N_1 = L/2S$
$L \approx 53.5$ cm.
$S = 30$ cm.

and therefore $\Delta N_1 = 0.89$

Now we set the argument of the sine in (24) to zero.

(25)     $\frac{x_0\theta_1}{2\lambda}+.89=0$

The fringe displacement angle $\theta_1$ is $\theta_1 = 1.78\lambda/x_0$; $\lambda/x_0 = \theta_f$ (fringe spacing)

The fringe displacements are compatible with the observations. Moreover, when L was doubled with the 4 lens system, $\theta_1$ doubled as would be expected.

What is claimed is:

1. A pair of Fabry-Perot enclosures arranged in series and sharing a common partially transparent mirror, one of said enclosures containing active laser material and constituting therewith a laser system providing an extended coherent source of light for illuminating the other of said enclosures through said common mirror; the optical path length of said other enclosure being an integral multiple of the optical path length of the laser enclosure, and said other enclosure containing optical lens means for imaging each mirror thereof on the other.

2. A Fabry-Perot enclosure defined by first and second spaced-apart partially transparent mirrors and between said mirrors optical lens means for imaging each of said mirrors on the other, said optical lens means comprising two telescopic systems arranged symmetrically about the longitudinal center of said enclosure with the exit pupils coextensive with the respective partially transparent mirrors and the entrance pupils superimposed at said center whereby a discrete beam of light passing through a discrete point in said entrance pupils and reflected in multiple passes traversing said enclosure will pass through said same discrete point on each traversal.

3. A multi-pass interferometer enclosure defined by first and second spaced-apart partially transparent mirrors, and between said mirrors telescopic system means for passing repeatedly over paths having substantially the same optical length, light reflected between two related points located one on each of said mirrors, in combination therewith means for illuminating said enclosure and providing an extended source of light having temporal coherence over a path length substantially as long as the total path distance of such repeated passes.

4. An interferometer giving imagewise interference patterns and adapted for illumination by a laser having large temporal coherence comprising: a multi-pass interferometer enclosure having first and second end mirrors, a telescopic optical system within said enclosure having pupils coextensive with said first and second end mirrors, respectively, and means for supporting an object in said enclosure at a pupil position in said optical system, said optical system imaging each of said end mirrors on the other such that a quantum of light passing back and forth through said enclosure will encounter said volume in substantially the same discrete area at each pass.

5. An interferometer according to claim 4 in which said optical system comprises two sets of telescope optics with the exit pupils coextensive with respective end mirrors of said enclosure and the entrance pupils coextensive with said object volume whereby the images of said end mirrors of the enclosure are optically folded back into coincidence in the object volume maintaining image sense through multiple passes of light.

6. An interferometer according to claim 5 in which said optical system comprises one telescopic system with the exit pupil coextensive with one end mirror, the entrance pupil coextensive with the other end mirror and the object volume situated substantially in a plane immediately adjacent to said other end mirror whereby the image of said one end mirror is folded back into coincidence with said other end mirror substantially at the location of the object volume maintaining image sense through multiple passes of light.

7. An interferometer including first and second multi-pass interferometer enclosures connected end-to-end both utilizing a single mirror surface at their common connection comprising:
  (a) a helium-neon laser in which the optical cavity is formed by said first interferometer enclosure;
  (b) said second interferometer enclosure having first and second end reflectors and being coupled to said laser by a common partially transparent mirror so that a maximum quantity of the laser output enters said second interferometer enclosure;
  (c) positive power optical imaging means within said second interferometer enclosure, said imaging members imaging each of said first and second reflectors on the other for maintaining image sense in light passing back and forth between opposite ends of said second interferometer enclosure; and
  (d) a second partially transparent mirror terminating said second interferometer enclosure for emitting light which can be focused for displaying interference phenomena.

8. An interferometer according to claim 7 in which said optical system comprises two telescopic systems arranged within said second Fabry-Perot enclosure with the exit pupils coextensive with the respective partially transparent mirrors and the entrance pupils superimposed at an object plane between said two telescopic systems.

9. An interferometer according to claim 8 in which said entrance pupils are larger in diameter than the exit pupil coextensive with said common transparent mirror.

10. An interferometric device comprising a multi-pass interferometer enclosure defined by first and second spaced-apart partially transparent mirrors and between said mirrors a single telescopic system arranged for imaging each of said mirrors on the other, said single telescopic system comprised of an objective lens, an ocular lens and an aberration corrector with a stopped aperture located at the Fourier transform plane between said objective and said ocular whereby spherical aberration in the device is held to a minimum.

11. A system for optical contrast enhancement as characterized by Schlieren systems comprising, a Fabry-Perot enclosure defined by first and second spaced parallel partially transparent plane mirrors and telescopic system means therebetween for imaging each of said first and second mirrors on the other.

12. A system for optical contrast enhancement according to claim 11 wherein said telescopic system means comprises two telescopic systems with their exit pupils coextensive with respective ones of said first and second mirrors and their entrance pupils coextensive with each other in a limited volume of space adapted for the introduction of a low contrast object.

13. An interferometer for making interference measurements by analyzing interference fringe displacements from an arbitrary reference fringe system comprising, a multi-pass interferometer enclosure defined by first and second spaced partially transparent mirrors, telescopic system means therebetween for imaging each of said first and second mirrors on the other, means to coherently illuminate said first mirror so as to transmit light into said enclosure and means to introduce a linear phase taper across the optical path inside said enclosure whereby a system of regularly spaced interference fringes is produced at said second mirror.

14. An interferometer according to claim 13 wherein said telescopic system means comprises two telescopic systems with their exit pupils coextensive with respective ones of said first and second mirrors and their entrance pupils coextensive with each other in a limited volume of space adapted for the introduction of object material for interferometric analysis.

15. An interferometer according to claim 14 wherein said linear phase taper is introduced by an optical phase taper plate positioned within said limited volume of space.

16. An interferometer according to claim 13 wherein said linear phase taper is introduced by tilting one of said first and second mirrors so that they are slightly out of parallel with each other.

References Cited

UNITED STATES PATENTS 3,293,565  12/1966  Hardy _____ 331—94.5

OTHER REFERENCES

Hardy, W. A.: Active Image Formation in Lasers, IBM Journal, January 1965, pp. 31–33 relied upon.

Universal Type Laser Interferometer JLI–01, Japan Electron Optics Laboratory Co., Ltd., JEOLCO (U.S.A.), Inc., 461 Riverside Ave., Medford 55, Mass.

RONALD L. WIBERT, *Primary Examiner.*

V. P. McGRAW, *Assistant Examiner.*

U.S. Cl. X.R.

331—94.5